United States Patent [19]

Hogg

[11] Patent Number: 4,568,227
[45] Date of Patent: Feb. 4, 1986

[54] ASYMMETRICAL DRILL BIT

[76] Inventor: Donald L. Hogg, 1518 Leo La., Clearwater, Fla. 33515

[21] Appl. No.: 505,884

[22] Filed: Jun. 20, 1983

[51] Int. Cl.⁴ .......................................... B23B 51/00
[52] U.S. Cl. ................................... 408/224; 408/227
[58] Field of Search .............. 408/228, 229, 227, 144, 408/231, 230, 199, 223, 224

[56] References Cited

U.S. PATENT DOCUMENTS

| | | | |
|---|---|---|---|
| 2,276,532 | 3/1942 | Welty | 408/231 X |
| 2,576,664 | 11/1951 | Berlien | 408/231 X |
| 3,014,386 | 12/1961 | Kallio | 408/229 |
| 3,138,043 | 6/1964 | Greuner | 408/144 X |
| 4,047,826 | 9/1977 | Bennett | 408/199 |
| 4,143,723 | 3/1979 | Schmotzer | 408/144 X |
| 4,400,119 | 8/1983 | Clement | 408/230 |

Primary Examiner—William R. Briggs
Attorney, Agent, or Firm—Ronald E. Smith

[57] ABSTRACT

An asymmetrical drill bit. A masonry-type bit having diametrically opposed, oppositely inclined top walls converging at an apex and having upstanding sidewalls is broken so that diametrically opposed, hollow ground, dished surfaces are formed such that the respective lengths of the top and sidewalls are diminished. The dished portions so formed are asymmetrical to the axis of rotation of the bit, and the structure exhibits a durability that substantially exceeds the durability of symmetrically ground bits.

2 Claims, 6 Drawing Figures

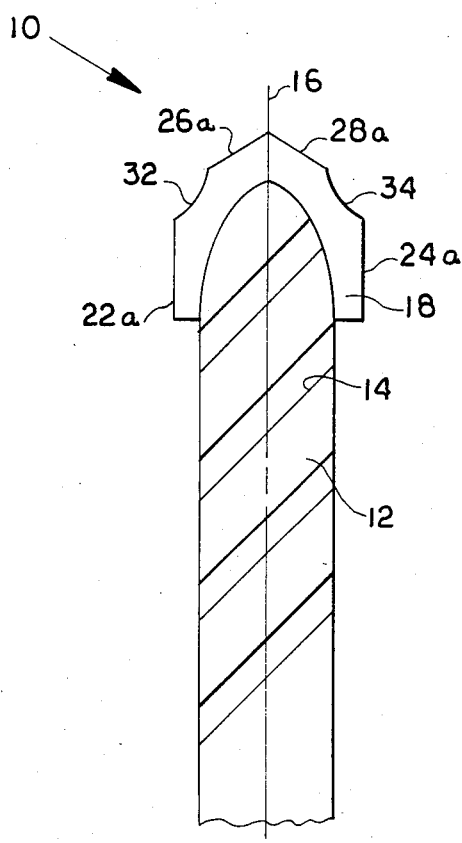
FIG_1
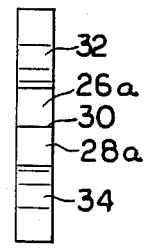
FIG_1A
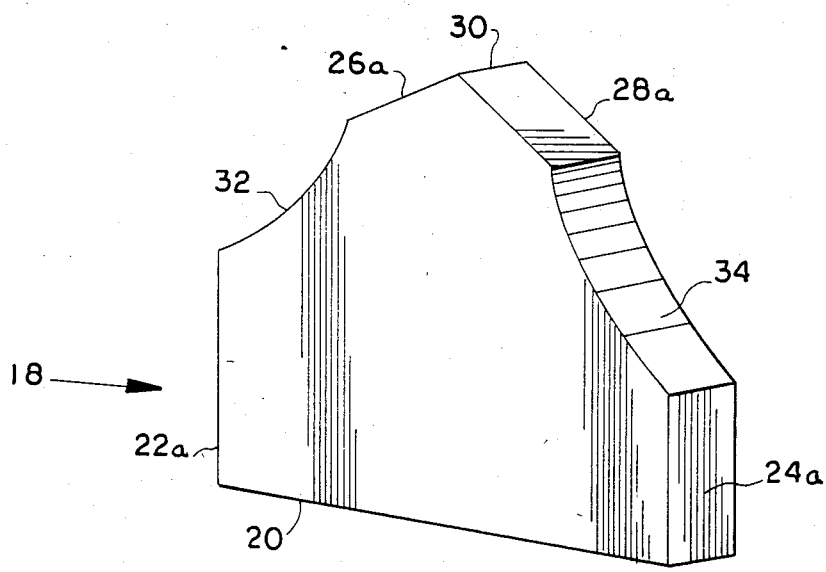
FIG_2

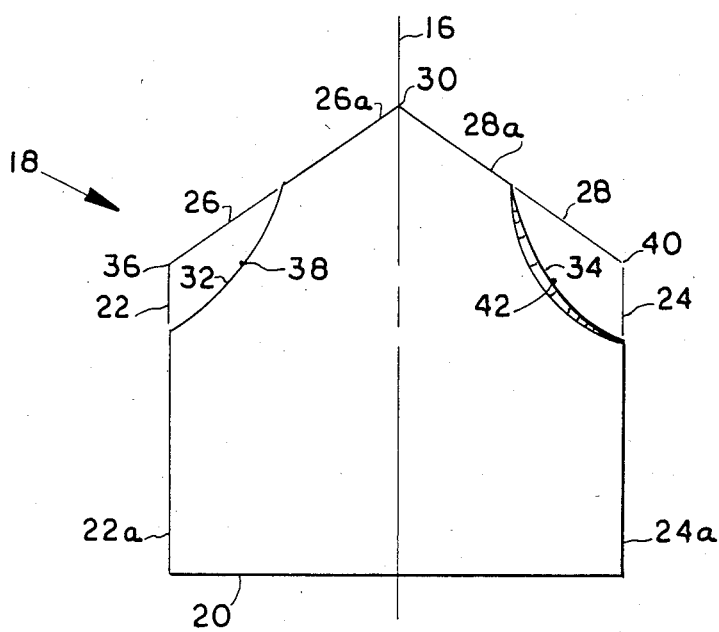
FIG_3
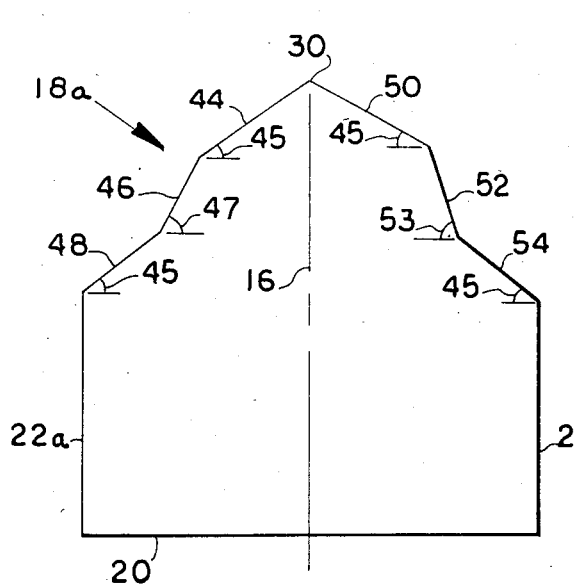
FIG_4
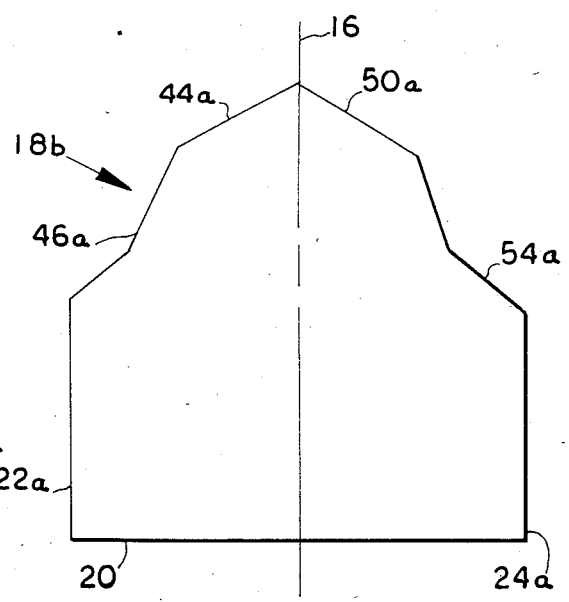
FIG_5

ASYMMETRICAL DRILL BIT

BACKGROUND OF THE INVENTION

1. Field of the Invention

This invention relates, generally, to drill bits, and more specifically relates to a drill bit having an asymmetrical structure.

2. Description of the Prior Art

A patentability search that was conducted prior to the filing of this disclosure located the following U.S. patents in the field of this invention:

| Patentee | U.S. Pat. No. | Date of Issue |
| --- | --- | --- |
| Doepker | 2,587,980 | 03/04/52 |
| Maier | 3,564,947 | 02/23/71 |
| Pomernacki | 3,564,948 | 02/23/71 |
| Kim | 4,209,275 | 06/24/80 |
| Ozer et al. | 4,338,050 | 07/06/82 |

All of the known drill bits are formed symmetrically. Indeed, it has long been the conventional wisdom to avoid lack of symmetry in any structure that rotates. As a result, all of the drill bits that have been provided heretofore are carefully formed to provide a very symmetrical structure.

Unfortunately, conventional drill bits, especially of the masonry type, have very short useful lifetimes. Typically, a masonry-type drill bit can drill only two or three holes before wearing out.

There is clearly a need for a masonry-type drill bit that does not wear out after only two or three jobs, but such a drill bit does not appear in the prior art.

SUMMARY OF THE INVENTION

The longstanding but heretofore unfulfilled need for a drill bit tip of enhanced durability is now provided in the form of a drill bit tip that is modified by breaking the same at preselected locations on opposite sides thereof in an asymmetrical pattern to form a cutting edge and a cleaning edge. Alternative embodiments modify the tip by grinding the same to provide asymmetrical angular profiles. In all of the inventive embodiments, the primary feature of the inventive drill bit is its lack of symmetry about its axis of rotation.

It is therefore seen to be a primary object of this invention to provide a masonry-type drill bit having a lifetime greater than the lifetimes of conventional drill bits.

It is another object to provide a method whereby the needed drill bit can be produced by making simple modifications to conventional drill bits.

The invention accordingly comprises the features of construction, combination of elements and arrangements of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the acccompanying drawings, in which:

FIG. 1 is a side elevational view of a first embodiment of the invention.

FIG. 1A is a partial top plan view of the embodiment shown in FIG. 1.

FIG. 2 is a perspective view of the drill bit shown in FIGS. 1 and 1A.

FIG. 3 is a side elevational view of the drill bit shown in FIG. 1.

FIG. 4 is a side elevational view of a second embodiment of the inventive drill bit.

FIG. 5 is a side elevational view of a third embodiment of the inventive drill bit.

Similar reference numerals refer to similar parts throughout the several views of the drawings.

DETAILED DESCRIPTION OF THE PREFERRED EMBODIMENT

Referring now to FIG. 1, it will there be seen that a first illustrative embodiment of the inventive comcept is identified by the reference numeral 10 as a whole.

The drill bit 10 is of the type employed when drilling masonry, tile, marble, and the like. As such, the bit 10 includes a shaft 12 having a helical flute 14 formed therein along its length and having a longitudinal axis of symmetry, or axis of rotation, 16.

A flat, planar in configuration tip member 18 is integrally formed with, or fixedly secured to, said shaft 12 and has a thickness less than the diameter of shaft 12, said thickness being depicted in FIG. 2.

The novel tip 18 differs from conventional tips as shown in FIG. 3, where the profile of the inventive tip 18 is depicted superimposed on the profile of a conventional tip.

Specifically, the tips of the prior art have a base portion 20, diametrically opposed upstanding sidewalls 22, 24, and diametrically opposed, downwardly inclined top walls 26, 28 that meet at an apex 30.

The tip 18 also has a base portion 20, bit its upstanding sidewalls 22a, 24a have less height than conventional tip sidewalls as is clearly shown in FIG. 3, and its inclined top walls 26a, 28a have less length as is also clearly shown. These structural dissimilarities are a result of the diametrically opposed arcuate walls 32, 34 that are provided in the embodiment of the invention now under discussion. The arcuate, or dished walls 32, 34 are formed asymmetrically with respect to the bit's axis of rotation 16. Thus, first top wall 26a, first dished wall 32, and second top wall 28a collectively provide the cutting edges that abrade the masonry attendant bit rotation. Second dished wall 34 provides a cleaning edge only and provides no cutting function.

To enable those skilled in the pertinent at to make and use embodiments of the invention, the following dimensions are provided for the embodiment shown in FIG. 3, which has been drawn at a scale of 12:1.

base wall 20 3"
first sidewall 22a 1 9/16"
second sidewall 24a 1⅛"
first top wall 26a 1"
second top wall 28a ⅞"

Moreover, the distance between first point 36 and the midpoint 38 of first arcuate wall 32 is ½", and the distance between the second point 40 and the midpoint 42 of second arcuate wall 34 is 9/16". These dimensions are simply divided by 12 to produce the respective dimensions of a preferred embodiment of the invention.

The respective arcuate walls 32, 34 are preferably hollow ground.

Another embodiment 18a of the invention that incorporates the inventive concept of an asymmetrically ground tip is shown in FIG. 4. This embodiment includes base wall 20, sidewalls 22a, 24a, a first radially inward top wall 44 inclined at a first predetermined angle 45, a first radially intermediate wall 46 inclined at a second predetermined angle 47 that is greater than the first angle 45, and a first radially outward wall 48 inclined at the first angle 45. Thus, the first radially inward and first radially outward top walls 44, 48 are parallel to one another.

A second radially inward top wall 50 is coplanar with and diametrically opposed to the first radially inward top wall 44, and is inclined downwardly at the same first angle 45. A second radially intermediate wall 52 is a like counterpart to the first radially intermediate wall 46 but is inclined downwardly at a predetermined angle 53 that is greater than the angle of slope 47 of such first intermediate wall 46. The second radially outward wall 54 is inclined at the first angle 45 so that second top walls 50 and 54 are parallel to one another.

The drill bit shown in FIG. 4 has four cutting edges, being the first radially inward, intermediate, and outward walls 44, 46, and 48, respectively, and the second radially inward wall 50.

Still another embodiment 18b is depicted in FIG. 5. As in FIGS. 2-4, an enabling scale of 12:1 is provided. Under this particular angular orientation of the top walls, the cutting edges are the first and second radially inward top walls 44a, 50a, the first radially intermediate top wall 46a and the second radially outermost top wall 54a. Again, the diametrically opposed top walls are asymmetrically formed with respect to the bit's axis of rotation 16, as in the other embodiments.

Conventional carborundum tips wear rapidly and can make only two or three bores in their useful lifetimes. It has been found that the inventive bit 18, however, can drill 20-30 bores prior to failure. The ten-fold improvement in performance is believed to be a function of the novel, asymmetric design and represents a significant advance in the art.

It will thus be seen that the objects set forth above, and those male apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described.

That which is claimed is:

1. A drill bit comprising an elongate, cylindrical shaft member with a longitudinal axis of rotation and having a helical flute means formed therein along its length, a generally planar in configuration tip member formed at the distal end of said shaft member, said tip member having a thickness less than the diameter of said shaft member, said tip member having an axis of symmetry disposed in axial alignment with the axis of rotation of said shaft member, said tip member having a pair of angularly inclined, first and second top wall members disposed in diametrically opposed relation to one another relative to a chisel edge means intersecting said axis and formed at an apex where said first and second top wall members meet at their respective radially inwardmost ends, wherein the improvement comprises:

said first and second top wall members having a flat portion adjacent said apex and a first and second arcuate dished portion, respectively, spaced from said apex by said respective flat portions;

said first and second dished portions being hollow ground and intersecting the tip periphery at longitudinally spaced positions;

and said first and second dished portions asymetrically disposed relative to said apex so that said first top wall, said first dished portion, and said second top wall collectively form a cutting edge attendant rotation of said drill bit about its axis of rotation so that said second dished portion forms a cleaning edge attendant said rotation.

2. A drill bit comprising an elongate, cylindrical shaft member with a longitudinal axis of rotation and having a helical flute means formed therein along its length, a generally planar in configuration tip member formed at the distal end of said shaft member, said tip member having a thickness less than the diameter of said shaft member, said tip member having an axis of symmetry disposed in axial alignment with the axis of rotation of said shaft member, said tip member having a pair of angularly inclined, first and second top wall members disposed in diametrically opposed relation to one another, a chisel edge means intersecting said axis and formed at an apex defined by said first and second top wall members, wherein the improvement comprises, said first and sescod top wall members having, respectively, a radially inward top wall segment contiguous to said apex, a middle top wall segment contiguous to said first top wall segment, and a radially outermost top wall segment contiguous to said middle top wall segment, said respective middle top wall segments being disposed at an angular inclination greater than the inclination of said respective radially inward top wall segments, said second middle top wall segment having an angular inclination greater than the angular inclination of said first middle top wall segment, said respective inward and outermost top wall segments disposed in parallel relation to one another, and said respective middle top wall segments having different angular inclinations such that the angular inclination of a first middle top wall segment is less than the angular inclination of a second middle top wall segment so that a cutting edge is collectively formed by the inward, middle, and outermost top wall segments of a first top wall and the inward segment only of a second top wall.

* * * * *